Figure 1:
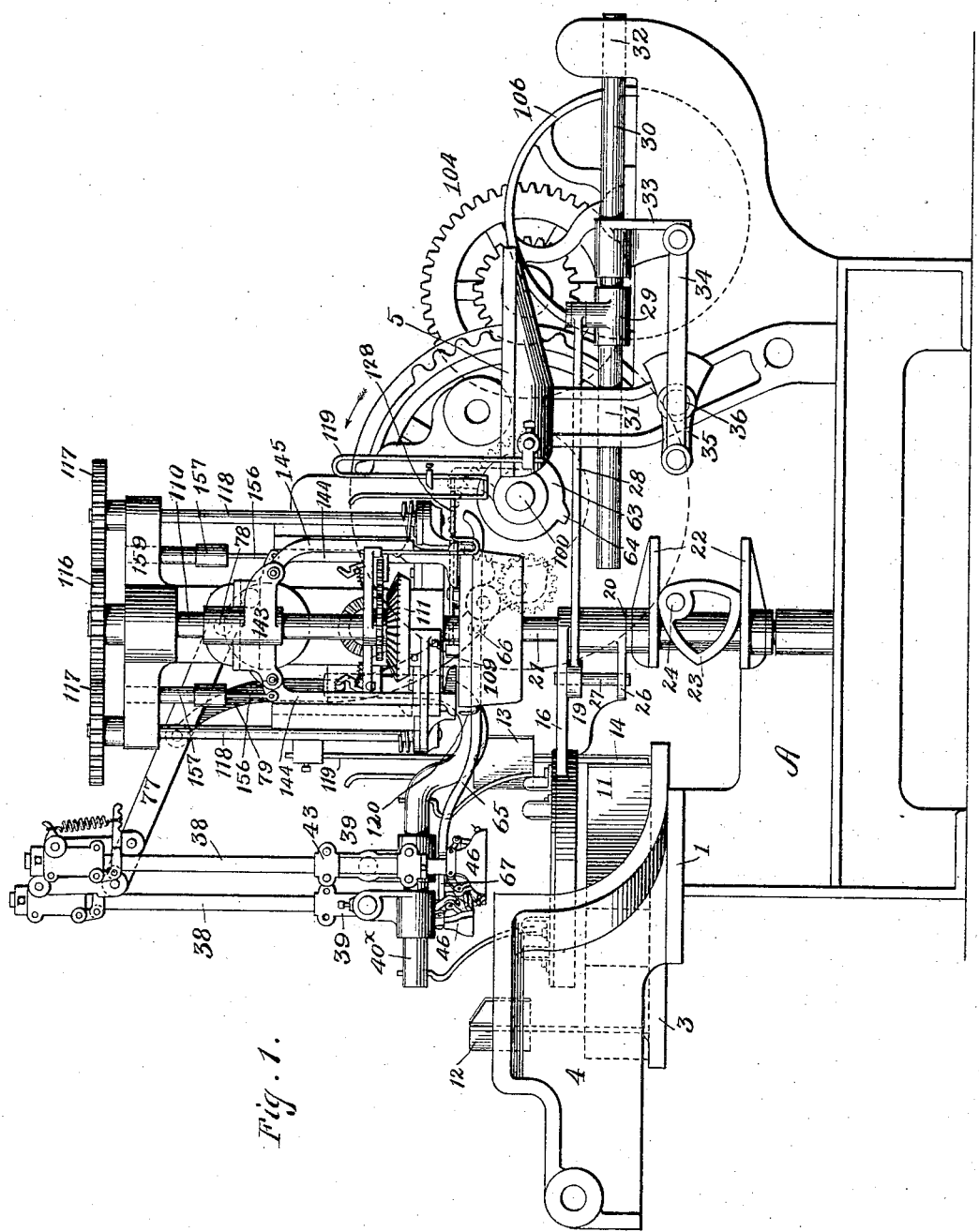

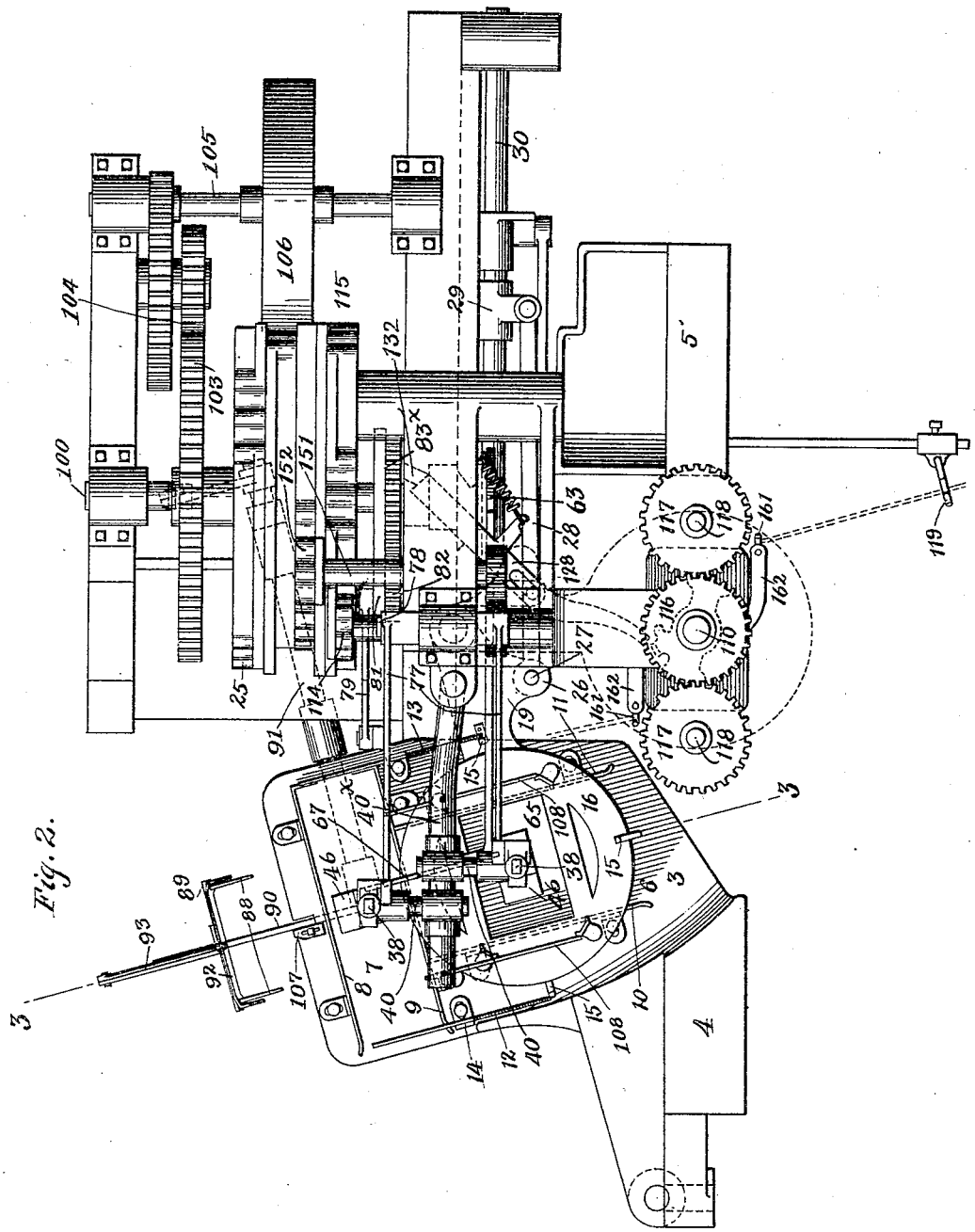

No. 765,839. PATENTED JULY 26, 1904.
E. HORTON.
BASKET MAKING MACHINE.
APPLICATION FILED DEC. 12, 1903.
NO MODEL. 9 SHEETS—SHEET 3.
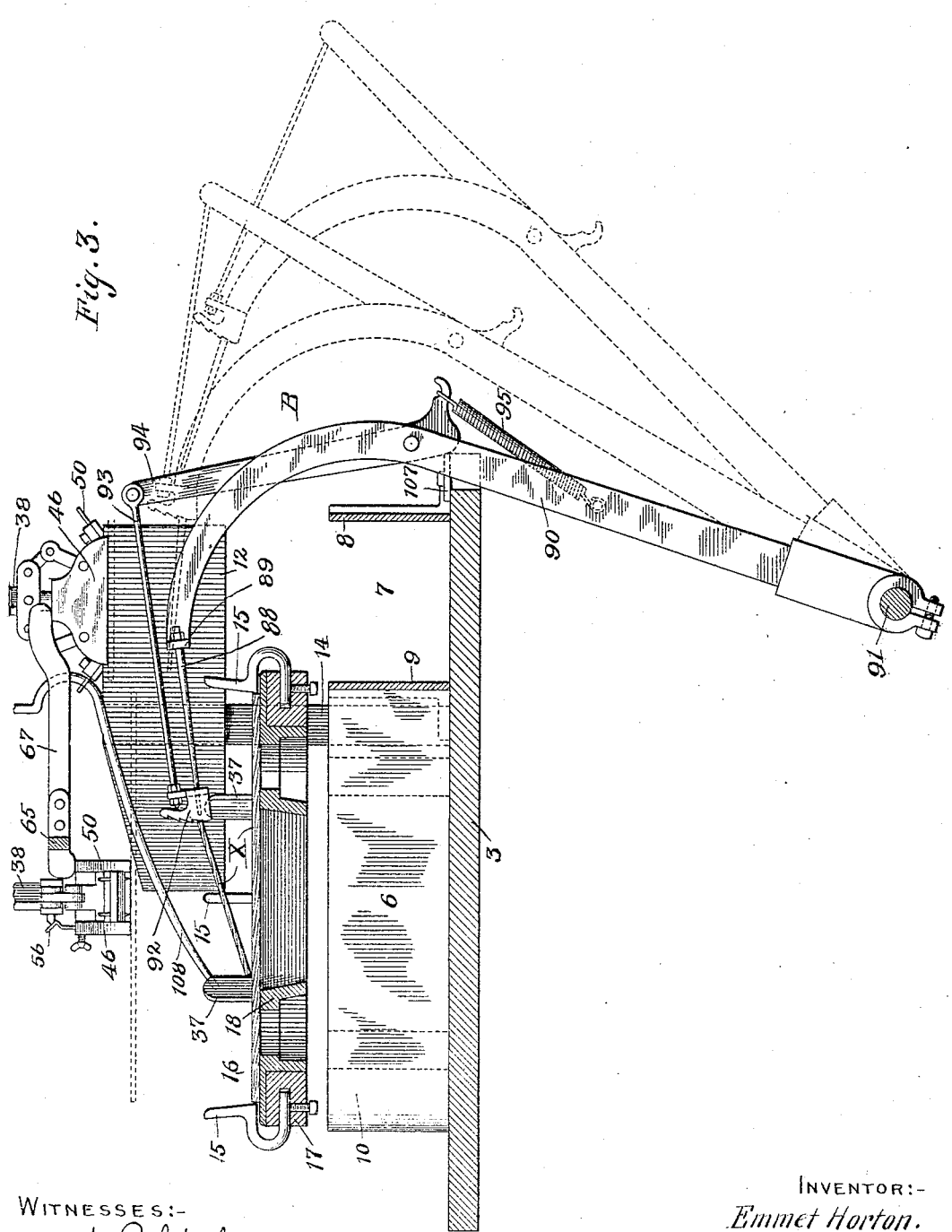
WITNESSES:—
Ernest Pulsford.
[signature]
INVENTOR:—
Emmet Horton.
BY HIS ATTORNEYS
Baldwin, Davidson & Wight

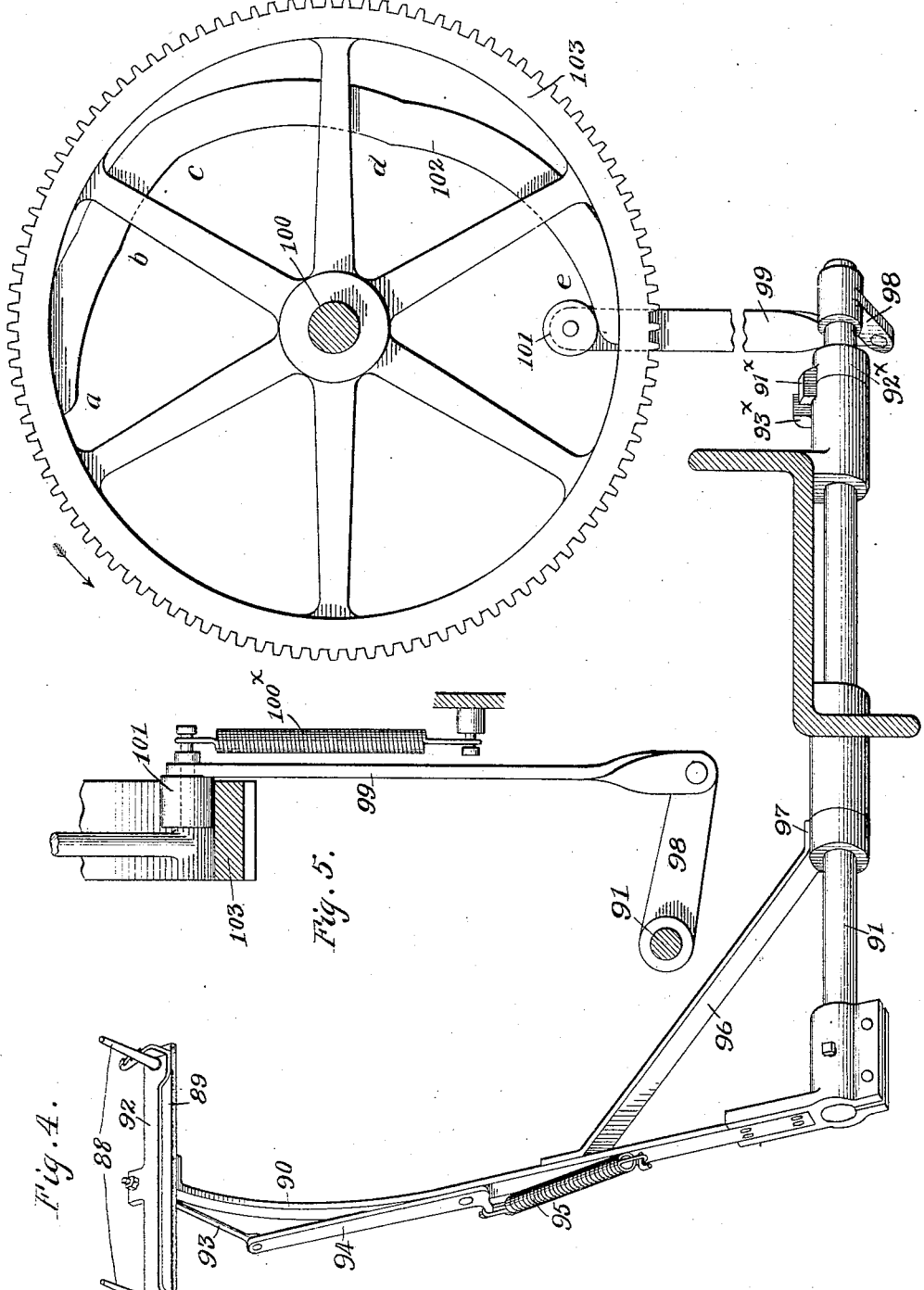

No. 765,839. PATENTED JULY 26, 1904.
E. HORTON.
BASKET MAKING MACHINE.
APPLICATION FILED DEC. 12, 1903.
NO MODEL. 9 SHEETS—SHEET 5.
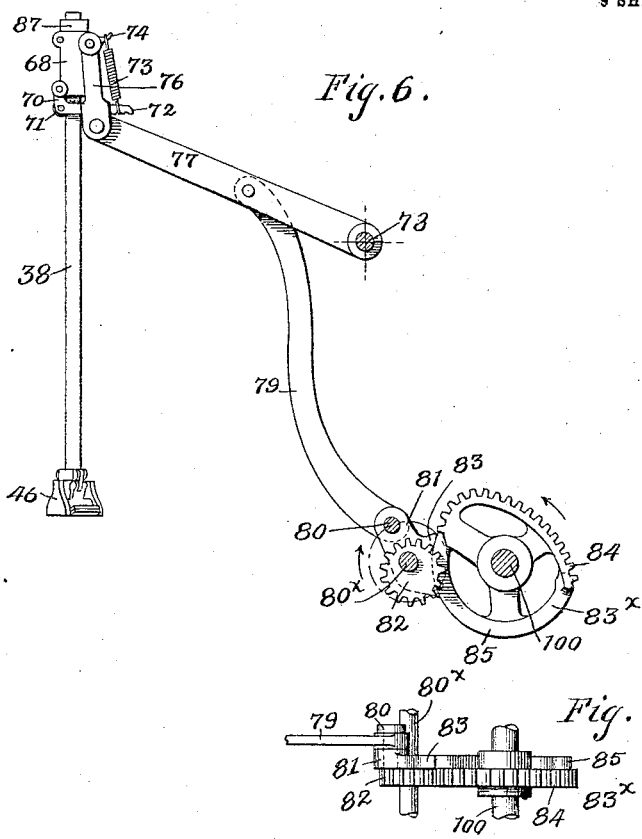
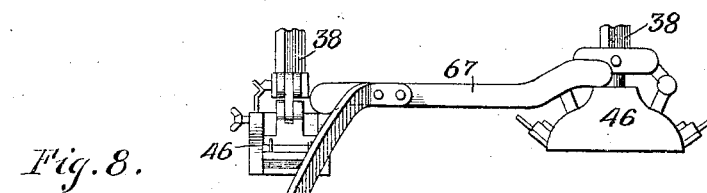
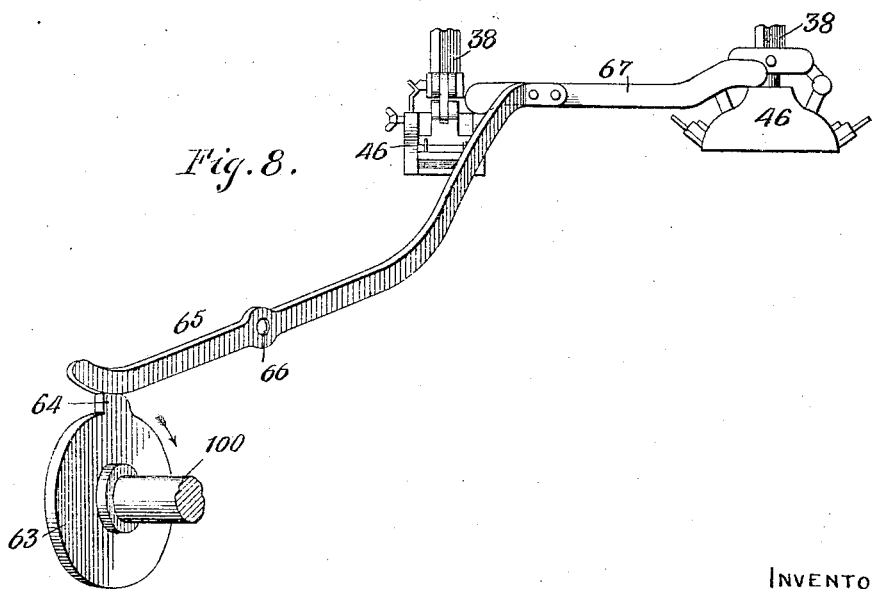
WITNESSES:-
Ernest Pulsford.
INVENTOR:-
Emmet Horton,
BY HIS ATTORNEYS,
Baldwin Davidson Wight

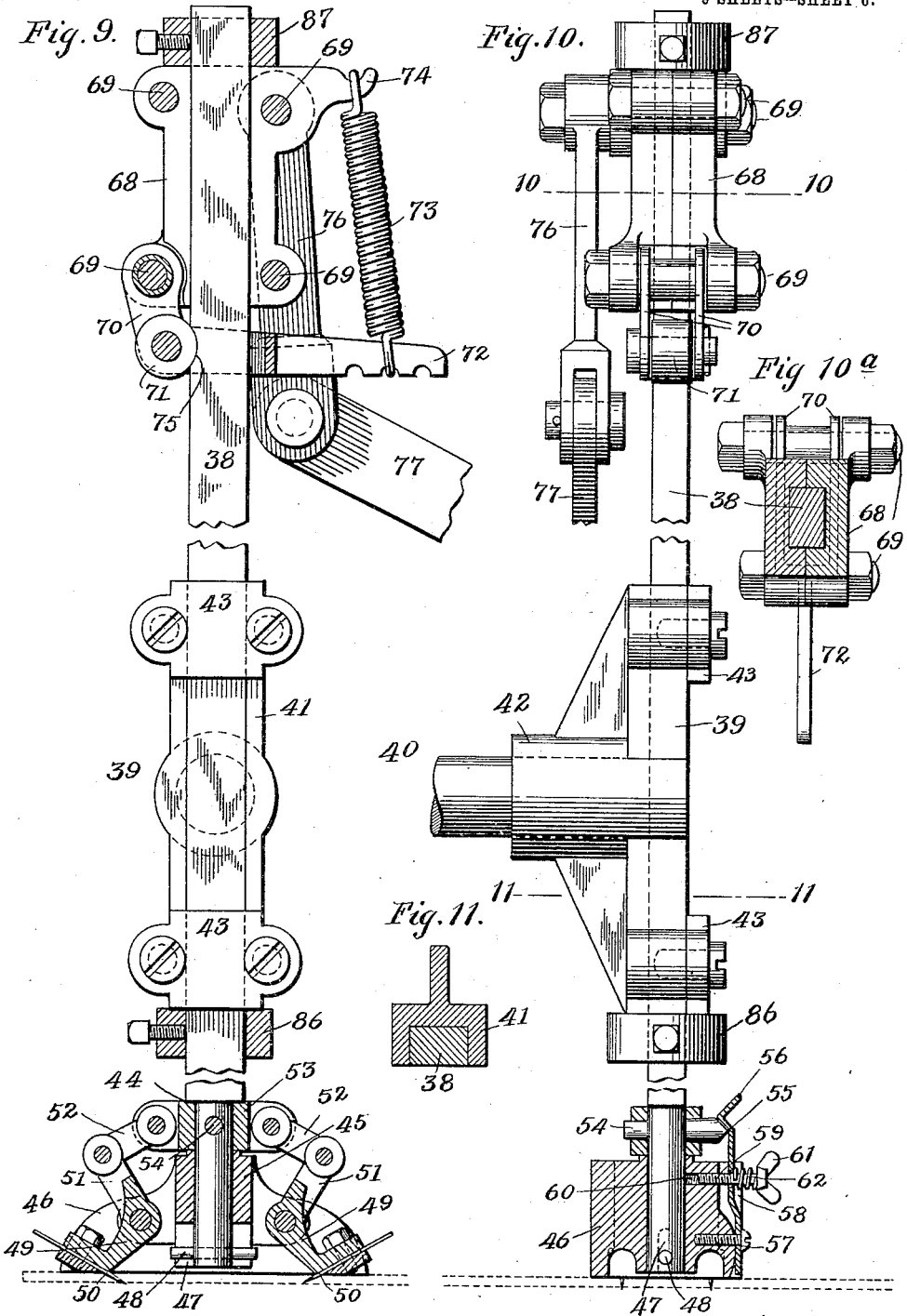

No. 765,839. PATENTED JULY 26, 1904.
E. HORTON.
BASKET MAKING MACHINE.
APPLICATION FILED DEC. 12, 1903.
NO MODEL. 9 SHEETS—SHEET 7.
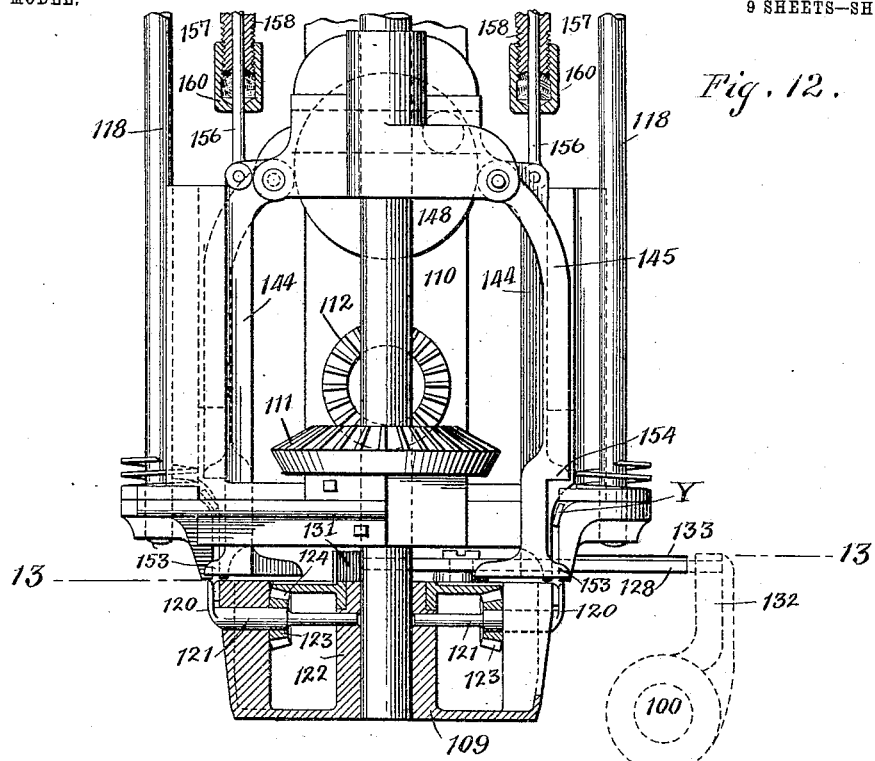
Fig. 12.
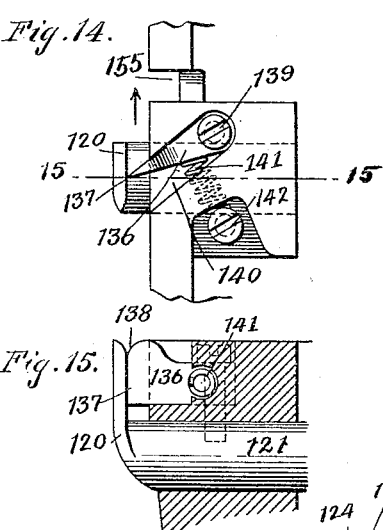
Fig. 14.
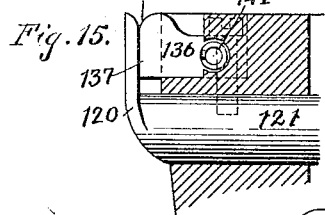
Fig. 15.
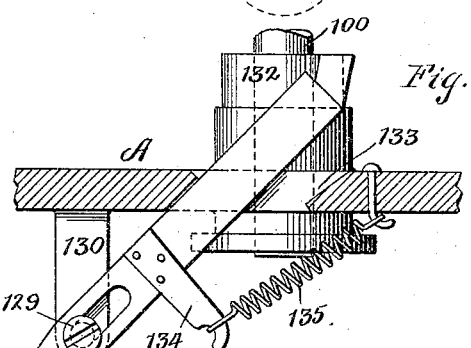
Fig. 13.
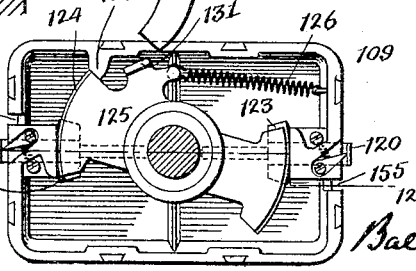
WITNESSES:
Ernest Pulsford
S. H. F. Inning
INVENTOR:
Emmet Horton,
BY HIS ATTORNEYS
Baldwin Davidson Wight

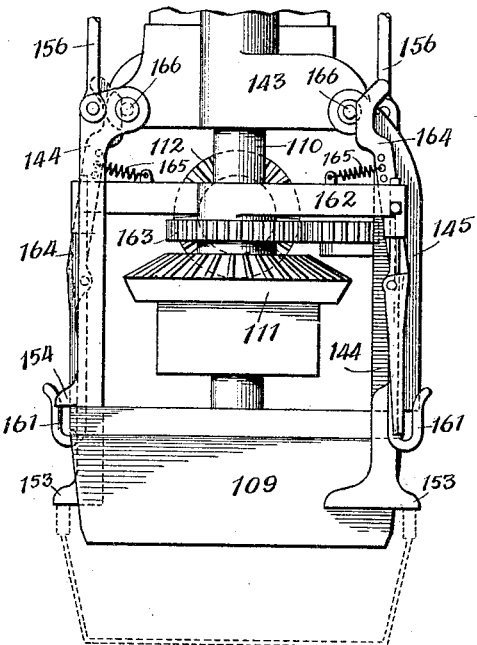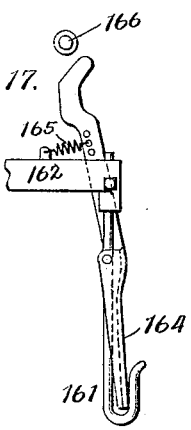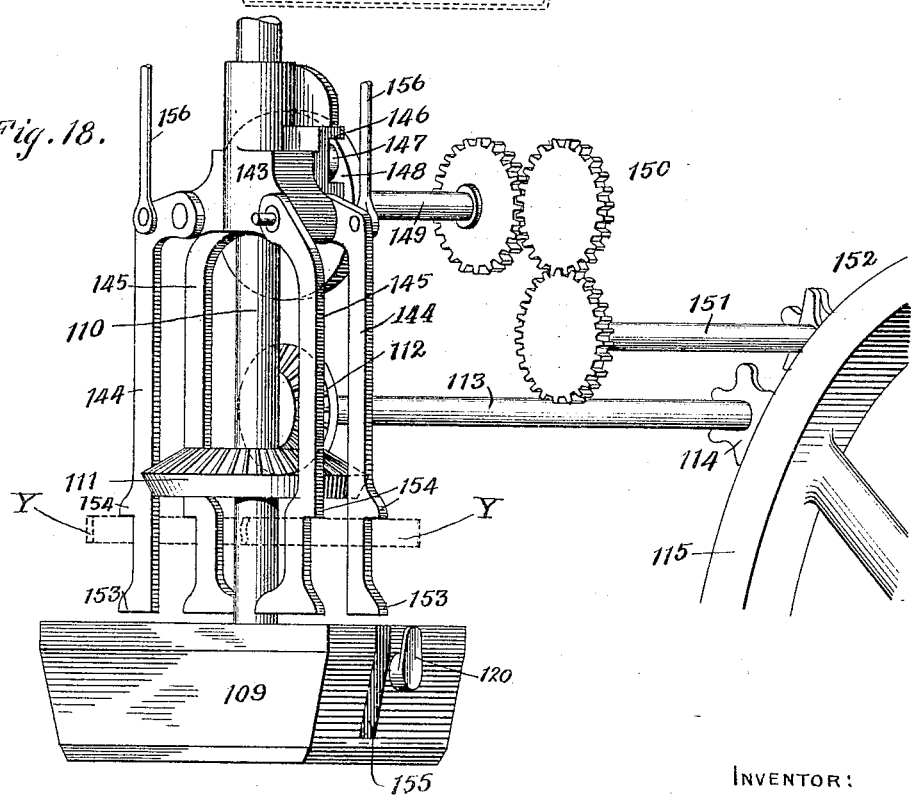

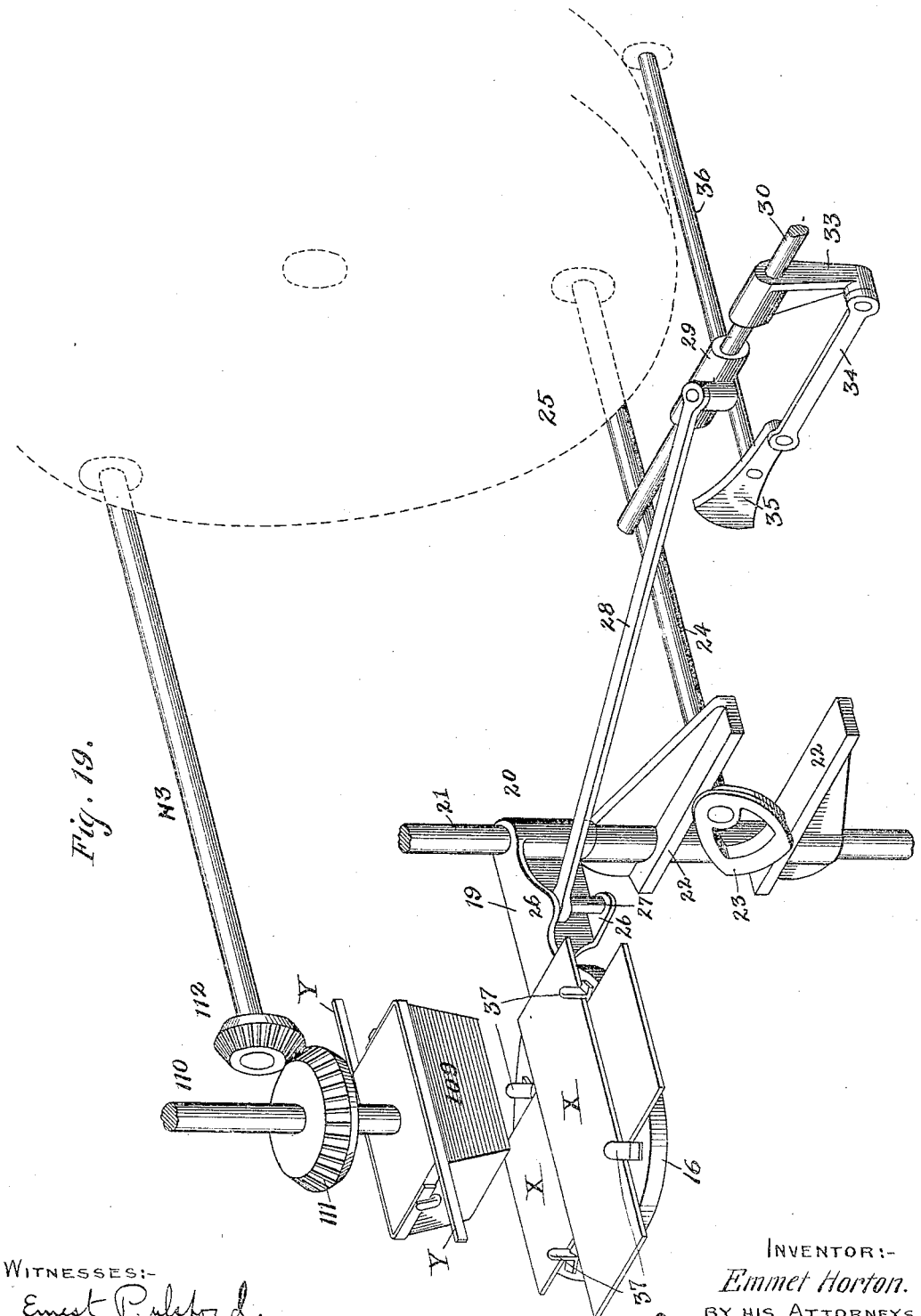

No. 765,839. Patented July 26, 1904.

UNITED STATES PATENT OFFICE.

EMMET HORTON, OF ELMIRA, NEW YORK.

BASKET-MAKING MACHINE.

SPECIFICATION forming part of Letters Patent No. 765,839, dated July 26, 1904.

Application filed December 12, 1903. Serial No. 184,956. (No model.)

*To all whom it may concern:*

Be it known that I, EMMET HORTON, a citizen of the United States, residing at Elmira, in the county of Chemung and State of New York, have invented certain new and useful Improvements in Basket-Making Machines, of which the following is a specification.

This invention relates to machines for automatically making baskets of the kind in which the sides and bottom of a basket are formed from crossed pieces of wood veneer or other similar material which are bent into shape by forming mechanism and are held in their bent or shaped condition by bands or strips of wood or similar material secured to the upper edges of the sides of the basket.

In my Patents No. 578,876, of March 16, 1897, and No. 680,149, of August 6, 1901, I have shown machines of this general type, and in my application for patent, Serial No. 132,740, filed November 25, 1902, I have shown a machine of the same type, but one which is especially designed to make oblong baskets.

My present invention, while involving especially improvements on the mechanism shown in my application for patent above referred to, contains features which are applicable to machines of this class generally.

My present improvements relate, first, to improved mechanism for raising the body-blanks for a basket from the receptacles in which they are piled and for depositing them upon a crane or carrier which conveys the blanks in a crossed relation to the bending or forming mechanism; second, to improved means for feeding the bands into engagement with the form; third, to improved means for holding the bands on the form during the formation of the basket, and, fourth, to improved means for separating the completed basket from the form.

My invention also relates to certain improvements in the specific means employed for raising and depositing the body-blanks and to novel organizations of the mechanism whereby the several operations in the formation of a basket are performed efficiently and harmoniously.

The machine shown in the accompanying drawings is designed to automatically make oblong baskets in quick succession. I do not, however, wish to be understood as confining my invention to a machine which is entirely automatic or a machine adapted to make oblong baskets, as many parts of the mechanism may be advantageously used in machines operated partly by hand or in machines adapted to make baskets of various shapes.

I have not illustrated in the drawings all parts of the machine in detail, as my present invention does not contemplate any change whatever in some of the parts—such, for instance, as the nailing mechanism—and the illustration of unnecessary details would merely confuse the illustration of those parts of the mechanism embodying my improvements. It will be understood, however, that the machine, as illustrated, is similar in general construction and mode of operation to the machine completely illustrated and described in my application of November 25, 1902, above referred to, and reference is made to said application for a more full and complete disclosure of the somewhat complicated mechanism involved in the automatic construction of the baskets. The drawings do, however, show the relation of the several parts concerned in the mechanism necessary to carry out my invention and how these parts are operated.

In the operation of the machine shown in my application above referred to the body-blanks of the baskets are lifted from their receptacles and placed on a crane or blank-carrier by means of pickers involving the use of needles that are moved diagonally into engagement with the blanks. My invention involves certain improvements in the details of this mechanism whereby it is made to operate more efficiently. The means which I now employ for lifting the pickers is also somewhat changed, being so constructed that instead of allowing the picker-heads to drop suddenly on the piles of blanks they are moved positively both toward and from the blanks by improved mechanism.

The means which I now employ for depositing the body-blanks on the crane or blank-carrier differs essentially from that shown in my prior application. In the prior machine the crane or carrier was so operated that it made two stops to receive the two blanks, while according to my present invention a single stop only is required. By this improvement I am enabled to make at least eight more baskets per minute than could be made by the other machine.

As heretofore, two piles of body-blanks are employed, and the pickers are arranged immediately over these piles. The crane or blank-carrier swings in a horizontal plane above the piles of blanks and below the pickers. The pickers lift the blanks to a plane above that in which the crane moves, all as in the prior machine. One of the blanks is deposited directly upon the crane; but the other blank after being lifted from the pile is delivered upon a frame or cradle above the pile of blanks from which it is taken and above the plane of the crane, and from this frame or cradle the blank is pushed laterally onto the top of the blank first deposited on the crane. This mode of operation involves quite a departure from that heretofore employed. The details of the mechanism for performing these operations will be hereinafter described; but it may be stated that the mechanism is such that both blanks may be deposited on the crane while the latter is making a single stop and while a basket is being constructed by other parts of the mechanism.

In my improved machine the form is considerably modified. It carries band-receiving hooks with which coöperate spring-pressed dogs that serve to hold the bands in the hooks. The hooks are mounted to turn about horizontal axes, whereby they may be at one time held up to receive the bands and at another time turned to permit the discharge of a completed basket. Gearing is provided which is automatically actuated to move the hooks at the proper time. The plungers which insert the bands into the hooks are also adapted to engage a completed basket and eject it from the form after the band-receiving hooks have been reversed or turned downward. These plungers, as in the prior machine, are made to swing on horizontal axes, so that after they have completed their downward movement and commenced to move upward they swing inward, so as to clear the bands which have been made to engage with the form and also the bands which are being fed by the band-feeding screws. This swinging movement of the plungers is obtained by means of rods which are made to pass vertically through friction devices and which are pivotally connected with the plungers at points to one side of their pivots.

In my prior machine the hooks which support the bands near the diagonally opposite corners of the form are provided with springs which exert a pressure on the bands while they are being drawn around the form. These springs exert such pressure at all times both while the bands are being drawn around the form and while the bands are being delivered to the hooks. I have found it desirable to make these springs movable, so that when the hooks are receiving the bands the springs shall be moved out of the way. This is effected by employing spring-rods which are pivoted to the hooks and which have upwardly-projecting portions that engage studs on a movable portion of the frame and which cause the springs to be withdrawn from the hooks at the proper time.

In the drawings, Figure 1 shows so much of a front elevation of a basket-making machine embodying my improvements as is necessary to illustrate the subject-matter herein claimed. Fig. 2 shows a top plan view of the same. The remaining views are on an enlarged scale. Fig. 3 shows a section on the line 3 3 of Fig. 2 and illustrates particularly the mechanism concerned in raising the body-blanks from their boxes and for depositing them crosswise on the crane or carrier which conveys the blanks to the bending mechanism. Fig. 4 is a diagram illustrating the construction and operation of the mechanism involved in placing one of the body-blanks crosswise of the other one. Fig. 5 is a detail view of part of the mechanism shown on Fig. 4. Fig. 6 shows the means for raising and lowering the pickers. Fig. 7 shows a top plan view of part of the mechanism shown in Fig. 6. Fig. 8 is a detail view in perspective of some of the mechanism involved in the actuation of the pickers to drop the body-blanks upon the crane or blank-carrier. Figs. 9 and 10 are views, partly in elevation and partly in section, of the picker mechanism. In Fig. 9 one part of the upper box through which the picker-rod extends is removed and parts of the picker-rod are broken away and the picker-head is shown in section and partly turned. In Fig. 10 I have shown a section of the picker-head at right angles to that shown in Fig. 9. Fig. $10^a$ shows a transverse section on the line 10 10 of Fig. 10. Fig. 11 shows a transverse section on the line 11 11 of Fig. 10. Fig. 12 is a detail view, partly in front elevation and partly in section, of the mechanism involved in feeding the bands to the form. The form is shown in section on the line 12 12 of Fig. 13, and in this figure the band-holding hooks and devices connected therewith are omitted. Fig. 13 is a detail view illustrating particularly the mechanism for turning the band-holding hooks on the form. The section is taken on the line 13 13 of Fig. 12. Fig. 14 is a detail top plan view showing the relation of the band-holding hook and the dog which coöperates therewith. Fig. 15 shows a vertical section on the line 15 15 of Fig. 14. Fig. 16 is another view of the mechanism involved in feeding the bands to the form. This figure shows a true front elevation of such mechanism, the band-holding hooks being also shown. Fig. 17 is a detail view of one of the band-holding hooks and the devices employed for moving its spring. Fig. 18 is a view in perspective further illustrating the construction and operation of the band-plungers. The band-holding hooks are omitted in this figure; but the mechanism for raising and lowering the plungers is shown diagrammatically. Fig. 19 is a diagram illustrating the construction and operation of the mechanism involved in rotating the form and in oscillating and raising and lowering the crane or blank-carrier.

The main frame A of the machine may be of any construction suitable to support the mechanism. It is in general similar to the frame shown in my application above referred to. The front portion of the frame has a lateral projection 1 on its left-hand side which supports the table 3, that carries the receptacles or boxes for the body-blanks. This portion 1 of the frame also supports a bracket 4, on which the nailing mechanism on the left-hand side of the machine may be supported. The corresponding right-hand nailing mechanism may be supported on the bracket 5. On the table 3 are two reservoirs 6 and 7, in which the body-blanks for the baskets are piled vertically. These blanks are oblong, those stored in the box 7 being somewhat narrower than than those stored in the box 6, and the boxes are so formed and arranged as to hold the blanks with their longest or longitudinal axes at right angles with each other in the manner indicated in Fig. 2. The box 7, as shown, has adjustable side plates 8 and 9, and the box 6 has adjustable side plates 10 and 11. Guide-plates 12 and 13 are also employed at the ends of the box 7 and above the top thereof These are arranged as shown clearly in Fig. 1 and are supported by rods 14, attached to the table 3. The crane 16 may be similar in all respects to that shown in my above-named application. I have merely shown the outlines of the crane. Briefly stated, it consists of a frame 17, containing a die 18, that is adapted to revolve within the frame 17. The frame 17 has an arm 19, formed with a hub 20, which is secured to a vertical shaft 21, carrying arms 22, between which is a cam 23 on a shaft 24, operated by a large mutilated gear-wheel 25. (Shown in plan in Fig 2 and illustrated diagrammatically in Fig. 19.) The arm 19 is formed with ears 26, connected by a vertical rod 27, which extends through a hole in the end of a pitman 28, connected with a sleeve 29, secured to a horizontally-reciprocating rod 30, guided in the main frame at 31 and 32. To the rod 30 is secured an arm 33, which is jointed at its lower end to a connecting-rod 34, in turn jointed to a crank-arm 35 on a shaft 36, which is operatively connected with the wheel 25. This mechanism, as before stated, is for the most part similar in all respects to that shown in my application before referred to. The construction and organization of this mechanism is such that at proper times the crane is oscillated, so as to be at one time directly under the form and at another time directly over the piles of body-blanks. When the crane is beneath the form, it is raised by means of the cam 23, so as to bend the body-blanks X around the form, and, as in the prior machine, the die 18 is adapted to rotate with the form when the blanks are bent around it. The only essential difference between the mechanism shown in Fig. 19 and similar mechanism in my prior application is that the gearing employed in the present machine is such as to move the crane continuously from the blank-receptacles to the form instead of allowing it to stop in order to receive the second body-blank; but it is thought to be unnecessary to show the mutilated gear-wheel employed for this purpose, as the arrangement of the teeth involves merely a mechanical expedient. The crane is provided with adjustable guides 15 and other guides 37, which cause the blanks to be deposited in proper crossed relation.

The pickers for raising the body-blanks from the boxes 6 and 7 are arranged directly over these boxes and above the plane in which the crane moves. The two pickers are similar in construction and operation, and the details of construction are most fully illustrated in Figs. 9 and 10. Each picker-bar 38 extends through a guide 39, attached to an arm 40, secured to a laterally-projecting arm or bracket $40^\times$ on the left-hand side of the machine. This guide, as shown, consists of a channel-plate 41, having a hub 42, attached to the arm 40 and receiving the picker-bar in its channel. The picker-bar is held in its channel by means of plates 43, attached to the channel-plate 41 in the manner clearly indicated in Figs. 9 and 10. At its lower end each picker-bar is rounded and shouldered at 44 to receive the hub 45 of the picker-head 46. The hub 45 is slotted at 47, and through this slot extends a pin 48, attached to the picker-bar near its lower end. The hub 45 is loose on the picker-bar—that is, it is free to move vertically relatively thereto, but is prevented from turning thereon by the pin 48. To the picker-head are pivoted two levers 49, carrying the diagonally-arranged needles 50, which are adapted to engage the body-blanks. The levers 49 have projecting portions 51, which are connected by links 52 with a collar 53, firmly secured to the picker-bar 38 by a pin 54. This pin is preferably tapered, as indicated in Fig. 10, and its outer larger end is formed with two inclines at 55, with which engages a spring-finger 56, secured at 57 to the picker-head and adapted to move back and forth in a recess 58, formed in the picker-head. A screw 59 extends through a hole in the spring-finger about midway between its ends and engages a threaded opening 60 in the picker-head. Between the head 61 of the screw and the spring-finger is interposed a spiral spring 62, which presses the finger toward the pin 54. In Figs. 9 and 10 the needles are shown as engaging a body-blank, the collar 53 having been moved downwardly relatively to the picker-head and having caused the needle to move diagonally into the blank. At this time the spring-finger 56 holds the parts in the position shown until they are moved positively out of such position. If now an upward movement be imparted to the picker-bar relatively to the picker-head, the levers 49 will be caused to swing and the needles will be withdrawn from the blank, allowing it to drop, and then the spring-finger 56 will pass from the position shown in Fig. 10 to a position below the pin 54 and in engagement with the lower tapered portion thereof and will hold the parts in such position until they are positively moved out of it.

The devices employed for giving the movement above referred to to separate the blanks from the needles is illustrated diagrammatically in Fig. 8 and is also indicated in other figures. A disk or wheel 63 on the main shaft 100 of the machine carries a cam 64, adapted to engage a lever 65, pivoted at 66 to the frame of the machine and carrying a cross-piece 67, which is adapted to engage with the tops of the picker-heads. This mechanism is so constructed and operated as to cause the cross-piece 67 to move the picker-heads downward relatively to the picker-bars and to thus withdraw the needles and allow the body-blanks to drop.

The picker-bars are raised and lowered by mechanism shown at the upper portion of Figs. 9, 10, and 10$^a$ and also in Figs. 1, 2, and 6.

Each picker-bar extends through a box or gripping-frame 68, consisting of two castings bolted together by four bolts 69. While the picker-bar is completely inclosed in the box, the latter is free at times to move on the picker-bar. One of the bolts 69 has pivoted to it the two shorter arms 70 of a bell-crank lever, which carries between its arms a roller 71. The arms pass on opposite sides of the picker-bar, and the opposite or longer arm 72 of the lever is connected, by means of a spring 73, with a lug 74, projecting from the upper portion of the box 68. The tension of the spring may be adjusted by varying its connection with the arm 72 in the manner indicated. The roller 71 is adapted to engage a notch or recess 75 in the picker-bar. In Fig. 9 it is shown as engaging such recess. On one of the bolts 69 at the upper end of the box 68 is pivoted a link 76, to which is jointed a lever 77, secured to a rock-shaft 78, mounted in bearings on the main frame. It will be understood that the two pickers are precisely the same in construction and operation and that each one of the boxes 68 is connected in the manner before described with the rock-shaft 78. To one of the levers 77 is jointed a pitman 79, (see Fig. 6,) which is connected, by means of a pin 80, with a crank-arm 81 on a pinion 82, which pinion is secured eccentrically to and revolves with a shaft 80$^\times$ and is formed with a shoe 83. The pinion and shoe are adapted to engage a cam 83$^\times$, secured to the main shaft 100. This cam has a series of teeth 84, adapted to engage the pinion, and a track 85, adapted to engage the shoe 83. It will be observed that the teeth 84 are arranged at different radial distances from the axis of the shaft 100. As the cam rotates the teeth 84, which engage the pinion, cause the shaft 80$^\times$ to turn, thus turning the arm 81 and giving proper movement to the pitman 79, which in turn gives an up-and-down movement to the pickers. That portion of the cam which has teeth at the greatest radial distance from the axis of the shaft 100 gives the quickest movement to the pickers, which is the downward movement thereof, while that portion of the cam which has teeth at the least radial distance from the axis of the shaft 100 gives a much slower movement to the pickers. By the mechanism shown the pickers may be moved rapidly downward into engagement with the body-blanks and moved more slowly upward, so as to prevent more than one blank from being raised by each picker and to prevent the premature separation of the raised blank from the needles. It will be observed that the movement given to the pickers is positive in both directions, whereas in my prior machines the pickers were allowed to drop by gravity upon the blanks. During each revolution of the shaft 100 the teeth 84 cause the pinion to complete one revolution to cause the pickers to descend and immediately rise. The pickers then remain stationary in their elevated position until the shaft 100 commences another revolution. When the teeth 84 are out of engagement with the pinion 82, the shoe 83 engages the track 85, thus preventing the shaft 80$^\times$ from being moved positively at this time or when not positively actuated by the engagement of the teeth 84 with the pinion. Shoes and tracks of this kind are shown in my application before referred to and in prior patents granted to me.

To each picker-bar below its guide 39 is attached a collar 86, and above each box 68 a collar 87 is secured to each picker-bar. If the parts be in the position shown in Fig. 9 and a downward movement is imparted to the boxes 68, the picker-bars will be moved positively downward until the picker-heads come in contact with the body-blanks. This positive downward movement of the pickers presses the blanks flat and puts them in the best condition to receive the needles. This pressure is considerable, owing to the fact that the rollers 71 while in the notches 75 cause quite a secure connection between the boxes and the picker-bars which requires considerable force to separate the rollers from the notches. After this has been done the boxes are enabled to pass freely downward on the picker-bars. The first movement given to the picker-bars while the rollers 71 are in the notches also causes the needles to be inserted in the blanks, inasmuch as the collars 53 are caused to move relatively to the picker-heads, and hence the levers 49 are moved to insert the needles. At the same time the pins 54 are thrust into position below the upper inclines of the spring-fingers 56 in the manner illustrated in Fig. 10. As the pitman 79 is reversed in its movement and the levers 77 are moved upward the pickers are raised with the body-blanks, which are held in engagement with the picker-heads until the collars 86 on the picker-bars come in contact with the under sides of the guides 39. At this time the picker-bars discontinue their upward movement; but the boxes 68 continue to move upward until they strike the collars 87, at which time the rollers 71 enter the notches 75, all the parts then being in the condition shown in Figs. 9 and 10, ready to have the blanks separated from the needles by means of the cross-piece 67. When this cross-piece is actuated, it causes the picker-heads to be moved downward, which movement causes the needles to be withdrawn from the blanks, which then drop.

One of the body-blanks is deposited directly upon the crane between the guide-posts 37. The other body-blank, however, is deposited upon a cradle B. This cradle is shown as consisting of two rods or fingers 88, projecting from a cross-piece 89 on the upper end of an oscillating lever 90, attached to a shaft 91. On the fingers 88 is supported a pusher 92, which extends from one finger to the other and has holes driven in it to receive the fingers, and it is adapted to slide longitudinally on the fingers. To the pusher 92 is secured a rod 93, which is jointed to the upper end of a relatively short lever 94, pivotally connected with the lever 90. (See Fig. 3.) The lower or shorter arm of the lever 94 is connected, by means of a spiral spring 95, to the lever 90. This lever 90 is secured to the shaft 91 in the manner best illustrated in Fig. 4, and it is preferably braced by a diagonal piece 96, also secured to the shaft 91 at 97. The shaft 91 is mounted to turn in bearings in the main frame, and to it is secured a crank-arm 98, to which is jointed a rod 99, carrying a roller 101, adapted to traverse a cam 102 on the large spur-wheel 103, secured to the shaft 100. This wheel 103 is connected by a train of gearing 104 with the main driving-shaft 105, on which is the belt-pulley 106. A spring $100^\times$, connected with the roller 101 and with the main frame, holds the roller in engagement with the cam 102, and the oscillation of the shaft 91 is limited by a lug $91^\times$ on a collar $92^\times$, secured to the shaft, which engages a lug $93^\times$ on the main frame. When a a blank X is dropped by the picker located over the box 7, the cradle and the parts connected therewith are in the intermediate position. (Shown by the dotted lines in Fig. 3.) At this time, as will be observed, the fingers 88 are directly beneath the blank, and the pusher 92 is removed to one side of the blank. As the lever 90 is moved inward the fingers are moved to the left, as viewed in Fig 3, and carry the blank X toward the central portion of the crane. After having moved part way inward the shorter arm of the lever 94 strikes against on adjustable stop 107 on the table 3. This causes the lever 94 to rock on its pviot and to move the pusher 92 along the cradle-fingers 88 and to slide the blank X off from the fingers in the manner indicated by the full lines in Fig. 3. In this manner the blank is very quietly deposited upon and crosswise of the other blank between the guide-posts 15 and 37. Wire guides 108, attached to the arm or bracket $40^\times$, prevent the blank from shooting over the opposite guide-posts when the machine is operating rapidly, and the guide-plates 12 and 13 guide the blank endwise on its way to the crane. The proper movements are given to the cradle by the cam 102. When the parts are in the position shown in Fig. 4, the cradle is in the outermost position. (Shown by dotted lines in Fig. 3.) If the wheel 103 be revolved in the direction shown by the arrow, the part $a$ of the cam will first engage the roller 101. When the roller is traveling on the parts from $a$ to $b$ of the cam, the cradle is moved to the intermediate position. (Shown by dotted lines in Fig. 3.) When the roller traverses the part of the cam from $b$ to $c$, the cradle is stationary in the intermediate position (shown in Fig. 3) and receives the blank X from the picker above it. When the roller is moving from $c$ to $d$, the cradle is moved to the position shown by full lines in Fig. 3 and the pusher is also moved to deliver the blank to the crane. When the roller traverses from $d$ to $e$, the cradle is returned to the outermost position. (Indicated by dotted lines in Fig. 3.) This mechanism operates most efficiently and enables me to considerably increase the output of machines of this class. As before stated, the crane stops only once to receive the body-blanks. Immediately after the first blank is deposited upon the crane the cradle operates to deposit the other blank thereon, and other parts of the machine are timed to be doing other work while the blanks are being deposited. Thus when the pickers are moving down and up from the boxes to the position shown in Fig. 3 the crane is under the form and the cradle is in its outermost position. After this the crane swings into position over the box of the larger body-blanks, and about the same time the lever 90 moves to the intermediate position shown, thus placing the cradle beneath the picker containing the smaller blank. The cradle only rests for an instant, long enough to receive the blank as it is dropped. Both blanks are deposited at the same time by means of the cross-piece 67, the larger blank dropping onto the crane while the other blank drops upon the cradle, immediately after which the cradle is moved forward and deposits the upper blank in the manner before described. While this is going on the mechanism for feeding bands to the form may be in operation.

The form 109 is secured to a vertical shaft 110, mounted to turn in suitable bearings in the main frame. It carries a bevel-wheel 111, gearing with another bevel-wheel 112 on a shaft 113, carrying a pinion 114, gearing with a mutilated gear-wheel 115, attached to the main shaft 100. These parts are all similar to those shown in my application above mentioned. At its upper end the shaft 110 carries a spur-wheel 116, meshing with spur-wheels 117 on the screw-carrying shafts 118, forming part of the band-feeding mechanism. The bands are fed in a similar way to that described in my before-mentioned application, the outer ends of the bands being supported by frames 119, of well-known construction. The body of the form is a hollow casting, and it carries band-hooks 120 at opposite ends. These hooks have stems 121, which extend through the end walls of the form and into holes in the hub 122 of the form. The stems carry bevel-pinions 123, which engage segments of teeth 124 on an oscillating plate 125, mounted to oscillate around the upper end of the hub 122 of the form. The plate is moved in one direction by a spring 126, attached to it and to the walls of the form, its movement in this direction being limited by the stop 127. The plate is moved in the opposite direction by means of a pusher-bar 128, attached by a slot-and-pin connection at 129 to a bracket 130, projecting from the frame A. This pusher-bar is adapted to engage a lug 131 on the plate 125, and its opposite end is adapted to engage a cam-lug 132, connected to revolve with the shaft 100. The lever 128 extends through an opening 133 in the frame A, and it has an arm 134, connected by a spring 135 to the frame in the manner indicated in Fig. 13. The construction and operation are such that when the form is in position to receive the bands the hooks are turned upward in the manner indicated in Fig. 12; but after the bands have been received and wrapped around the body-blanks the lever 128 is actuated to move the plate 125, which imparts a rotary movement to the pinions 123 and causes the hooks 120 to be reversed or turned downward, at which time the basket is ejected from the form in the manner hereinafter described. After the lever 128 has been moved forward to actuate the plate 125 the cam-lug 132 passes by and the lever is returned to its original position by the spring 135. The construction and arrangement are such that should the shaft 100 be turned in a reverse direction the lug 132 will pass the lever 128 without causing it to engage the plate 125, because in this case the lever will be merely swung about its pivot at 129 and will be returned to its original position by means of the spring 135 as soon as the lug passes. Coöperating with the hooks 120 are the dogs 136. Each of these dogs is of the form clearly indicated in Figs. 14 and 15. Each one has a sharp outer vertical edge 137 and an inclined upper end 138, which facilitates the entrance of the band. The inner end of the dog is pivoted to the form at 139, and each dog is adapted to have a limited movement in the recess 140, made in the top of the form. Each dog is pressed in one direction by a spring 141, which is inserted through a horizontal opening in the frame of the form and held in place by a vertical screw 142. The spring tends to press the outer sharp edge of the dog toward the hook—i, e., into engagement with the band, and thus cause the band to be held between the hook and the dog. The outward movement of the dog is limited by the walls of the recess, so that the edge of the dog merely touches the hook. On the form-shaft 110 is a cross-head 143, from which are suspended four band-plungers 144 and 145. The cross-head has a horizontal channel 146, with which engages a roller 147 on a pin attached to a disk 148 on the front end of a shaft 149, which gears, by means of the train of gearing 150, (shown in Fig. 18,) with a shaft 151, carrying a pinion 152, engaging teeth on the mutilated gear-wheel 115. This mechanism is also similar to that shown in my application above mentioned. The plungers are, however, shaped differently at their lower ends from those shown in my prior machines. Each plunger has a bottom portion or foot 153 and a lug 154 some distance above the foot. The two plungers 144 are adapted to enter slots or recesses 155 in the ends of the form close to the hooks 120. The bands Y for the basket are fed beneath the lugs 154 in the manner indicated in Fig. 12, and as the plungers are lowered the feet 153 engage the top of a basket just completed and cause the basket to be stripped from the form. Further downward movement of the plungers brings the bands under the lugs 154 into engagement with the hooks 120 and dogs 136. To each of the plungers 144 is jointed a vertical rod 156, which extends through friction devices 157 of the kind illustrated in Fig. 12. These friction devices consist of tubes 158, projecting downwardly from the cross-head 159 of the main frame and having threaded lower ends with which engage caps 160. Tapered recesses are formed in the lower ends of the tubes 158, and the inner faces of the ends of the caps may also be formed with concaved or tapered recesses. Between the ends of the caps and the ends of the tubes is interposed candle-wicking or other similar material adapted to exert a friction on the rods 156, which friction may be adjusted by adjusting the caps. The object of these devices is to cause the band-plungers to swing in their vertical movements. After a basket has been stripped from the form and bands have been inserted in the hooks 120 it is necessary that the band-plungers be moved inward in order that they may not separate the bands from the hooks as the plungers rise and in order that they may not interfere with the feeding of new bands by the screws on the screw-shafts 118. The operation is such that when the plungers are first raised the vertical movement of the rods 156 is impeded by the friction devices, and this causes the plungers to be swung inward to a sufficient extent to allow them to clear all the bands that would otherwise be in their path. After the plungers have moved to the limit of their upstroke and moved downward they are again swung in an opposite direction into the proper position to engage the bands fed by the screws. These friction devices for swinging the band-plungers are much simpler and are more effective than those heretofore employed by me.

As heretofore, I employ two band-holding hooks 161 to assist in supporting the bands while being wrapped around the form. It will be understood that when an oblong form is employed it is desirable in order to hold the bands close to the form that the band-holding hooks should move in short arcs about the axis of the form in order to at all times be close to the corners of the form and hold the bands in line with the side walls thereof. Devices of this sort are shown in my prior application, and the mechanism shown in the present application is similar in construction and operation to that heretofore employed. Fig. 16 shows the band-holding hooks suspended from a frame 162, which is operated by gearing 163 from the form-shaft 110. Heretofore, however, the band-hooks have been provided with springs which at all times press outwardly and exert a pressure on the bands, not only while they are being wrapped around the form, but also while they are being inserted into the hooks. I have found it desirable to so construct the hooks that they shall admit of the free insertion of the bands without spring-pressure, and therefore I have adopted the mechanism illustrated particularly in Figs. 16 and 17. As there shown, each hook has pivoted to it a lever 164, which is pronged above the cross-head 162 and has attached to it a spring 165, which is also attached to the frame 162. This spring tends to move the lower end of the plate 164 to the position shown in Fig. 17, where a pressure will be exerted on a band in the hook. It will be understood that the frame 162 has no vertical movement while the cross-head 143 moves vertically. This cross-head carries two laterally-projecting pins or studs 166, each of which is adapted to engage the upper end of one of the levers 164 in the manner indicated in Figs. 16 and 17. When the cross-head is at the limit of its upward movement, the studs 166 are disconnected from the levers 164. At this time the bands which have been made to engage with the form are in the hooks 161 and are being drawn through them as the form revolves; but as the cross-head descends to cause the band-plungers to move the new bands into engagement with the form the studs 166 come in contact with the levers 164 and cause the lower ends thereof to be moved inward or to the position shown in Fig. 16, at which time new bands are fed into the hooks 120 and 161. Of course the band-plungers are raised before the form begins to rotate, and after the plungers are raised out of the way the studs 166 are again disengaged from the plates 164, and these plates move to the position shown in Fig. 16 and hold the bands with a yielding pressure as they are being wrapped around the form when the latter rotates. It will thus be seen that when the bands are inserted in the hooks 161 they have no spring-pressure to overcome. Bands vary materially in thickness, and the spring-pressure necessary for thick bands is often too great for thin bands to overcome while they are being inserted. Where the spring-pressure is very great, thin bands are apt to double over and they often fail to be properly inserted in the hooks; but by the improved devices, where the springs are withdrawn while the bands are being inserted, all kinds of bands may be readily fed to the hooks and then pressure may be applied which will yieldingly hold the bands while they are being drawn from the hooks and wrapped around the form.

As in the machine shown in my prior application above mentioned, two bands are first made to engage the form. Then the form is given a quarter-turn to wrap the bands around it in the manner indicated in Fig. 19. At this time the body-blanks may be deposited on the crane, which at this time is in position to receive them. The crane is then moved to the position shown in Fig. 19 below the form, and the crane is then raised to bend the body-blanks around the form and to inclose the bands therewith. The form is then turned to wrap the bands around the outside of the body-blanks, and the nailers are operated to secure the body-blanks and bands together. As soon as this is done the hooks 120 are reversed and the band-plungers descend and strip the completed basket from the form. The band-hooks are then turned upward and receive other bands for another basket. After this the operations above described are repeated to construct another basket, and these operations are continued to automatically construct successive baskets without any assistance from the operator until the supply of body-blanks and bands is exhausted. Of course additional piles of body-blanks and bands may be quickly supplied.

While my present improvements are preferably embodied in a machine which is entirely automatic, my claims are not necessarily limited to automatic mechanism, as some of the operations may be performed by hand and yet be within the scope of my invention.

I claim as my invention—

1. In a basket-making machine, a picker for separating a blank from a pile of blanks, comprising a picker-head provided with devices for engaging a blank, a picker-bar connected with but having a limited movement relatively to the picker-head, and devices for yieldingly holding the picker-head at the limit of its movement in either direction relatively to the picker-bar.

2. In a basket-making machine, a picker for separating a blank from a pile of blanks, comprising a picker-head, needle-carrying levers pivotally connected therewith, a picker-bar connected with but having a limited movement relatively to the picker-head, and devices for yieldingly holding the picker-head at the limit of its movement in either direction relatively to the picker-bar.

3. In a basket-making machine, a picker, comprising a picker-head provided with devices for engaging a body-blank, a picker-bar connected with but having a limited movement relatively to the picker-head, and a spring-pressed finger on one of said parts adapted to engage with an inclined surface on the other part and which yieldingly holds the picker-head on the picker-bar at the limit of its movement in either direction.

4. In a basket-making machine, a picker for raising a blank from a pile of blanks, comprising a picker-head, a picker-bar connected with but having a limited movement relatively to the picker-head, needle-carrying levers carried by the picker-head, a collar secured to the picker-bar, links connecting said collar with the needle-carrying levers, a pin attached to the picker-bar and having at its end a doubly-inclined surface, and a yielding finger carried by the picker-head engaging said pin.

5. In a basket-making machine a picker for raising a blank from a pile of blanks, comprising a picker-bar, a picker-head connected with but having a limited movement relatively to the picker-bar, needle-carrying levers pivoted to the picker-head, a vertically-reciprocating box or frame having devices for yieldingly engaging the picker-bar and moving it vertically, a collar on the upper end of the picker-bar for limiting the vertical movement of the box relatively to the picker-bar, a guide-casing near the lower end of the picker-bar, and a collar on the picker-bar below said guide-casing.

6. In a basket-making machine, the combination of a picker-head, a picker-bar connected therewith, a guide-casing in which the picker-bar reciprocates, a collar secured to the picker-bar below the guide-casing and which limits the upward movement of the picker-bar, a vertically-reciprocating box or frame having devices yieldingly engaging the picker-bar and a collar secured to the picker-bar above said box and which limits the upward movement of the box relatively to the picker-bar.

7. In a basket-making machine, the combination of a picker-head, a picker-bar connected therewith, means for guiding the picker-bar, a box or frame adapted to move with the picker-bar, a gripping device carried by said box or frame and adapted to automatically engage the picker-bar and to automatically disengage therefrom, and means for reciprocating said box.

8. In a basket-making machine, the combination of a picker-head, a picker-bar connected therewith, means for guiding the picker-bar, a box or frame adapted to move endwise on the picker-bar, a gripping device yieldingly engaging a portion of the picker-bar, and means for reciprocating said box or frame to first move the box or frame with the bar and to then move the box or frame relatively to the bar.

9. In a basket-making machine, the combination of a picker-bar, a picker-head connected therewith and having a limited movement relatively thereto, and means for moving the picker-bar positively but yieldingly toward a pile of blanks and also positively away from said pile.

10. In a basket-making machine, the combination of a picker-bar, a picker-head connected therewith and having a limited movement thereon, means for moving the picker-bar positively toward a pile of blanks to cause the picker-head to press upon the blanks, and devices carried by the picker-head for engaging the blanks and which are operated by the picker-bar during its continued movement after the blanks have been pressed by the picker-head.

11. In a basket-making machine, the combination of a picker-head provided with devices adapted to engage a body-blank for a basket, a picker-bar connected with said picker-head and having a notch or recess in its upper portion, a box or frame mounted on the picker-bar and having a spring-pressed roller adapted at times to engage said notch or recess, and at other times to ride on the edge of the bar, and means for reciprocating said box or frame whereby said box is at first caused to move with the picker-bar and then to move relatively thereto.

12. In a basket-making machine, the combination of a picker-head, needle-carrying levers carried thereby, a picker-bar connected with the picker-head but having a limited movement relatively thereto, links connecting the needle-carrying levers with the picker-bar, a box or frame mounted on the picker-head and having a gripping device adapted to yieldingly engage a portion of said bar, means for moving said box or frame positively in both directions, a stop for limiting the movement of the picker-bar away from a pile of blanks and a stop on the picker-bar for limiting the movement of the box or frame away from said blanks.

13. In a basket-making machine, the combination of a picker-head provided with devices adapted to engage a body-blank, a picker-bar connected therewith, a gripping box or frame yieldingly engaging the bar, a spur-wheel operatively connected with said gripping-box, and a cam-wheel having a series of teeth adapted to engage said spur-wheel and which are arranged at different radial distances from the axis about which the cam-wheel revolves whereby the picker is moved positively and rapidly in one direction and positively but slowly in the opposite direction.

14. In a basket-making machine, the combination of a picker-bar, a picker-head connected therewith but having a limited movement relatively thereto, needle-carrying levers pivoted to the picker-head, links connecting said levers with the picker-bar, a lever having a cross-piece engaging the picker-head and adapted to move it downward, and a cam-wheel adapted to move said lever to cause its cross-piece to depress the picker-head and thus cause the needle-carrying levers to move on their pivots and cause the needles to be moved diagonally out of engagement with the body-blank to which they are attached.

15. In a basket-making machine, the combination with means for separating two blanks from piles of blanks, of a blank-carrier or crane, means for depositing one of said separated blanks directly upon the crane, and devices upon which the other blank is first deposited and which move said blank laterally onto the crane or blank-carrier crosswise of the blank first deposited thereon.

16. In a basket-making machine, the combination with means for separating two blanks from piles of blanks, of a crane or blank-carrier, means for depositing one of said separated blanks directly upon said crane or carrier, a cradle upon which the other separated blank is deposited, and devices for moving said blank laterally from the cradle onto the crane or blank-carrier crosswise of the blank first deposited thereon.

17. In a basket-making machine, the combination with means for separating two blanks from piles of blanks, of a crane or blank-carrier movable in a plane between the piles of blanks and the blanks separated therefrom, means for depositing one of said separated blanks directly upon the crane or carrier, and a cradle which receives the other separated blank and which is provided with devices for moving said blank laterally onto the crane crosswise of the first-mentioned blank.

18. The combination with means for separating two blanks from piles of blanks, of a crane or blank-carrier movable between the piles of blanks and the blanks separated therefrom, means for depositing one of said separated blanks upon the crane, a cradle for receiving the other separated blank, and devices carried by said cradle for moving the blank laterally from the cradle onto the crane.

19. In a basket-making machine, the combination with a picker for raising a blank from a pile of blanks, of a crane or blank-carrier, a cradle movable between the pile of blanks and the picker, and a pusher carried by said cradle and which moves the blank laterally from the cradle onto the crane.

20. In a basket-making machine, the combination with a picker for raising a blank from a pile of blanks, of a crane or blank-carrier, a cradle movable between the pile of blanks and the picker, an oscillating lever to which the crane is connected, a pusher carried by the cradle, a lever pivoted to the first-mentioned lever and connected with the pusher, and mechanism for operating said first-mentioned lever.

21. In a basket-making machine, the combination of two pickers for raising body-blanks from two piles of blanks, a crane or blank-carrier, means for moving said crane between one of said piles of blanks and one of said pickers, means for reciprocating the picker toward and from the piles of blanks, means for moving the crane beneath the pickers after they have been raised, a cradle, means for moving it beneath one of the pickers after it has raised a blank, means for separating the blanks from the pickers and depositing one of them directly on the crane, means for then further moving the cradle, and a pusher for moving the blank carried thereby laterally from the cradle onto the crane above and crosswise of the blank first deposited thereon.

22. In a basket-making machine, the combination of a rotary form having a band-holding hook, means carried by the form for reversing the hook at proper intervals, and a pusher-bar operated positively from the power-shaft and engaging at intervals the hook-reversing means carried by the form.

23. In a basket-making machine, the combination of a rotary form, a band-holding hook carried thereby, an oscillating plate carried by the form and gearing with the hook, a spring for moving the plate in one direction, and a power-oscillated pusher for moving the plate in the opposite direction.

24. In a basket-making machine, the combination of a rotary form having band-holding hooks at its ends, spur-wheels connected with said hooks, a plate having teeth and engaging said spur-wheels, a spring for moving said plate in one direction, and a power-actuated pusher-bar for moving said plate in the opposite direction whereby the hooks are reversed at intervals.

25. In a basket-making machine, the combination of a rotary form, a band-holding hook, an oscillating plate carried by the form and gearing with said hook, a spring for moving the plate in one direction, a pusher-bar guided by the main frame of the machine, a spring for moving said bar in one direction, and a power-actuated cam for moving the bar in the opposite direction.

26. In a basket-making machine, a form provided with a reversible band-holding hook, and a spring-pressed dog movable into and out of the hook.

27. In a basket-making machine, the combination of a form, a band-holding hook thereon, a dog mounted in a recess in the form and movable into and out of the hook, and a spring pressing the dog against one wall of its recess and holding it in such position that its outer end barely touches the hook along its vertical inner wall.

28. In a basket-making machine, the combination of a form, a band-holding hook carried thereby, a band-plunger having a portion adapted to engage the upper edge of a completed basket and strip it from the form and another portion adapted to engage a band and move it into engagement with the band-holding hook on the form, and means for reciprocating said plunger relatively to the form.

29. In a basket-making machine, the combination of a form, reversible band-holding hooks carried thereby, vertically-moving plungers having portions adapted to engage the upper edge of a completed basket and strip it from the form when the band-holding hooks are turned downward, and other portions adapted to engage bands and force them into the band-holding hooks when the latter are turned upward.

30. In a basket-making machine, the combination of a form provided with a band-holding hook, a band-plunger, a frame to which said plunger is pivoted at its upper end, means for reciprocating said frame vertically, a rod connected to said plunger to one side of its pivotal connection with said frame, and a casing through which said rod extends and which is provided with means for exerting a friction on the rod.

31. In a basket-making machine, the combination of a rotary form, means for feeding bands into engagement therewith, a band-holding hook, devices within the hook for exerting a yielding pressure on the band and means for at times relieving this pressure.

32. In a basket-making machine, the combination of a rotary form, means for feeding bands into engagement therewith, a band-holding hook, a spring-pressed lever pivoted thereto and adapted to press one end of the lever yieldingly against the band-hook and devices engaging the opposite end of the lever for moving the lever in the hook to withdraw it from the band.

In testimony whereof I have hereunto subscribed my name.

EMMET HORTON.

Witnesses:
H. K. FUHRMAN,
LEWIS E. WRIGHT.